United States Patent [19]
Walton

[11] 4,086,528
[45] Apr. 25, 1978

[54] CAPACITIVE TRANSDUCERS

[75] Inventor: Hyman Walton, Beckermet, England

[73] Assignee: United Kingdom Atomic Energy Authority, England

[21] Appl. No.: 720,822

[22] Filed: Sep. 7, 1976

[30] Foreign Application Priority Data

Sep. 17, 1975 United Kingdom .............. 38191/75
Oct. 16, 1975 United Kingdom .............. 42546/75

[51] Int. Cl.² ........................................... G01R 27/26
[52] U.S. Cl. ................................ 324/61 R; 73/304 C
[58] Field of Search ........................ 324/61 R, 61 P; 73/304 C

[56] References Cited

U.S. PATENT DOCUMENTS

| | | | |
|---|---|---|---|
| 2,570,218 | 10/1951 | Draganjac | 324/61 R X |
| 3,119,266 | 1/1964 | Atkinson | 324/61 R X |
| 3,533,286 | 10/1970 | Westcott et al. | 324/61 R X |
| 3,553,575 | 1/1971 | Shea | 324/61 R |
| 3,716,782 | 2/1973 | Henry | 324/61 R |
| 3,742,347 | 6/1973 | Walton | 324/61 R |
| 3,928,796 | 12/1975 | Kaiser | 324/61 R |
| 3,995,488 | 12/1976 | Crawley | 324/61 R X |

Primary Examiner—Stanley T. Krawczewicz
Attorney, Agent, or Firm—Larson, Taylor and Hinds

[57] ABSTRACT

Measuring apparatus for determining a linear quantity comprising a capacitance transducer having at least one capacitance variable in accordance with changes in the dimensions of the quantity being measured, and a reference capacitor of substantially constant capacitance with respect to these changes. The transducer and the reference capacitor are connected to two charge amplifiers in two separate arms of a four arm bridge network, the input impedances of the charge amplifiers forming the other two arms. A source is provided for applying an alternating current input signal to the transducer and reference capacitor, and a differential amplifier is provided to receive the output from the charge amplifiers to provide an output related to the value of the linear quantity. The value of the linear quantity may be expressed as the voltage to be applied to the transducer to maintain the variable capacitor at a constant charge.

11 Claims, 8 Drawing Figures

EXTERNAL DIAMETER
(b)

INTERNAL DIAMETER
(c)

SENSOR CONFIGURATION
(a)

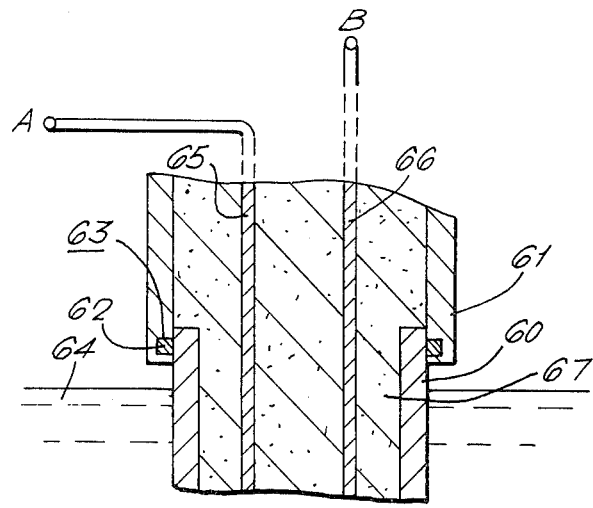
FIG. 4.
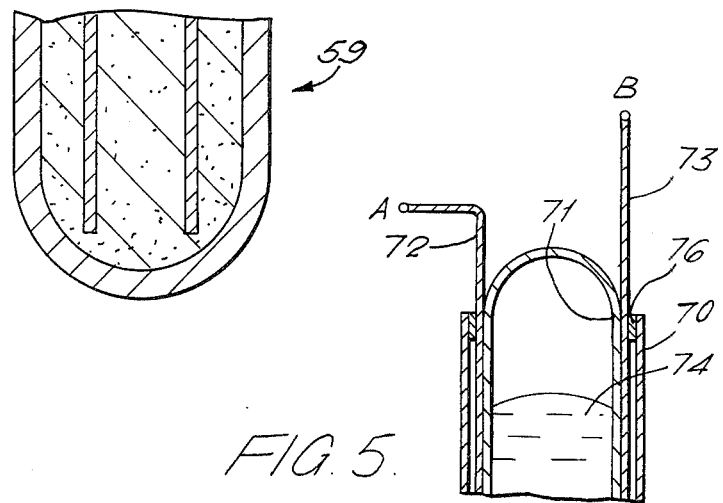
FIG. 5.
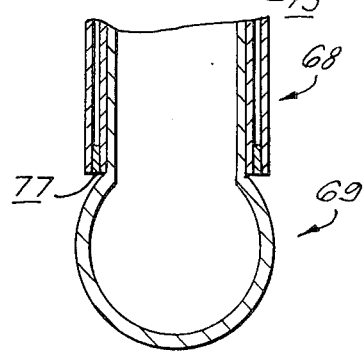

CAPACITIVE TRANSDUCERS

This invention concerns capacitive transducers for measuring linear quantities.

In British Patent Specification No. 1340703 there is disclosed an apparatus for measuring change in the magnitude of a physical quantity which can cause variation in electrical capacitance between two members, the apparatus comprising a capacitive transducer having members forming two capacitors of which at least one has a capacitance variable in accordance with the physical quantity being measured, means connecting the capacitors in two separate arms of a four terminal electrical network having four arms, two charge amplifiers having connections such that the input impedances of the amplifiers form the other two arms of the network, means for applying an AC carrier input signal across the junction between the capacitors and the common junction of the charge amplifiers, means for obtaining a signal dependent on the difference between the outputs of the charge amplifiers, and means for demodulating said dependent signal to give an output representative of the change in magnitude of the physical quantity being measured. The change in the magnitude of the physical quantity to be determined can be a displacement of one body relative to another body. One particular application of the apparatus of patent specification No. 1340703 can lie in the accurate positioning of nuclear fuel elements within channels in a reactor core.

SUMMARY OF THE INVENTION

The present invention represents a development of the aforesaid invention described in specification No. 1340703, and according to the present invention there is provided an apparatus for determining a linear quantity, the apparatus comprising a capacitative transducer having members adapted to form at least one capacitance variable in accordance with changes in said quantity; a capacitor of substantially constant capacitance with respect to said changes; two charge amplifiers; means connecting the capacitative transducer to one of the charge amplifiers and the constant capacitor to the other charge amplifier in two separate arms of a four terminal network having four arms, the charge amplifiers having connections such that the input impedances of the charge amplifiers form the other two arms of the network; means for applying an alternating current carrier input signal to the transducer and the constant capacitor, and receiving means for receiving the output from both charge amplifiers and providing an output signal related to the value of said quantity.

The capacitative transducer may comprise members forming two capacitances variable in the accordance with changes in said quantity and arranged diametrically opposite one another, the apparatus being adapted to determined the dimensions of a body disposed between said two capacitances.

The capacitative transducer may comprise a probe means adapted for immersion in a liquid and arranged so that the capacitance of the probe means relates to the depth of immersion of said probe means.

The capacitance transducer may comprise a probe means adapted for determining the linear dimension of a column of mercury representing a physical parameter, such as temperature.

The apparatus may be provided with feedback means adapted to receive the output signal and vary the voltage applied to the variable capacitance in relation to said output signal to maintain a constant charge on said variable capacitance, whereby changes in the applied voltage correspond to changes in the linear quantity.

The capacitative transducer may be provided in part by a probe means, the other part of said transducer being provided in operation of the apparatus by a body having a non-conducting film thereon, and the capacitative transducer so formed may be adapted for the determination of the thickness of the film.

A "charge amplifier" is a DC operational amplifier with capacitative feedback which can produce an output voltage directly proportional to the change of charge at its input terminals.

BRIEF EXPLANATION OF THE DRAWINGS

The invention will now be particularly described by way of example only with reference to the accompanying drawings in which:

FIG. 4 shows an alternative capacitative transducer having a single variable capacitance and arranged as a liquid level probe;

FIG. 5 shows another alternative capacitative transducer having a single variable capacitance and arranged to determine the length of a column of mercury in a thermometer;

DETAILED DESCRIPTION OF THE INVENTION

Figure 1A:
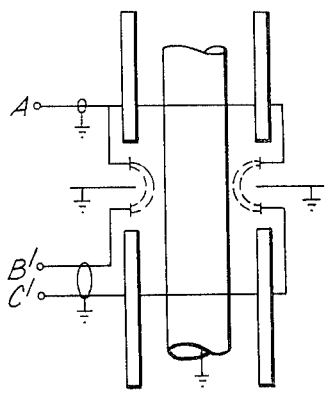
FIG. 1a shows diagrammatically a capacitative transducer arrangement for measuring the external diameter of an object and having members forming two variable capacitances.
Figure 1B:
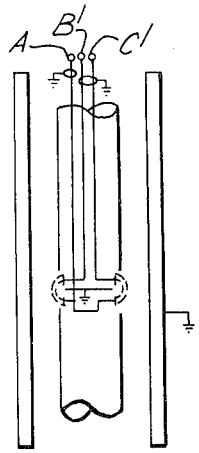
FIG. 1b shows diagrammatically a capacitative transducer arrangement similar to that shown in FIG. 1a but arranged for measuring the internal diameter of a body.
Figure 2:
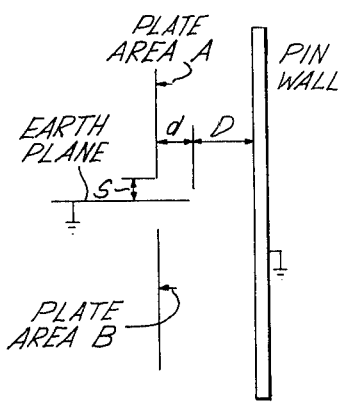
FIG. 2 shows the sensor portion of FIG. 1b to an enlarged scale.

Referring now to FIGS. 1a and 1b the transducer arrangements shown in these Figures are identical to those shown in British Patent Specification No. 1340703, two variable capacitances being disposed diametrically opposite to one another so as to determine the external diameter of a rod (FIG. 1a) or the internal diameter of a tube (FIG. 1b). FIG. 2 corresponds to FIG. 2a of specification No. 1340703 and is effectively a portion of FIG. 1b to an enlarged scale. Each variable capacitance is connected at one plate to a terminal B' or C' respectively and at its other plate to a common terminal A arranged to be fed from an alternating current carrier signal source (not shown in FIGS. 1a or 1b). The capacitances of each of the variable capacitances is a function of the diameter of the rod disposed between them as explained more fully in specification No. 1340703 to which reference is directed, and therefore provides a way of determining the diameter of a rod, or the corresponding dimension of a non-circular bar, in the apparatus shown in FIG. 3 to which reference is now made.

Figure 3:
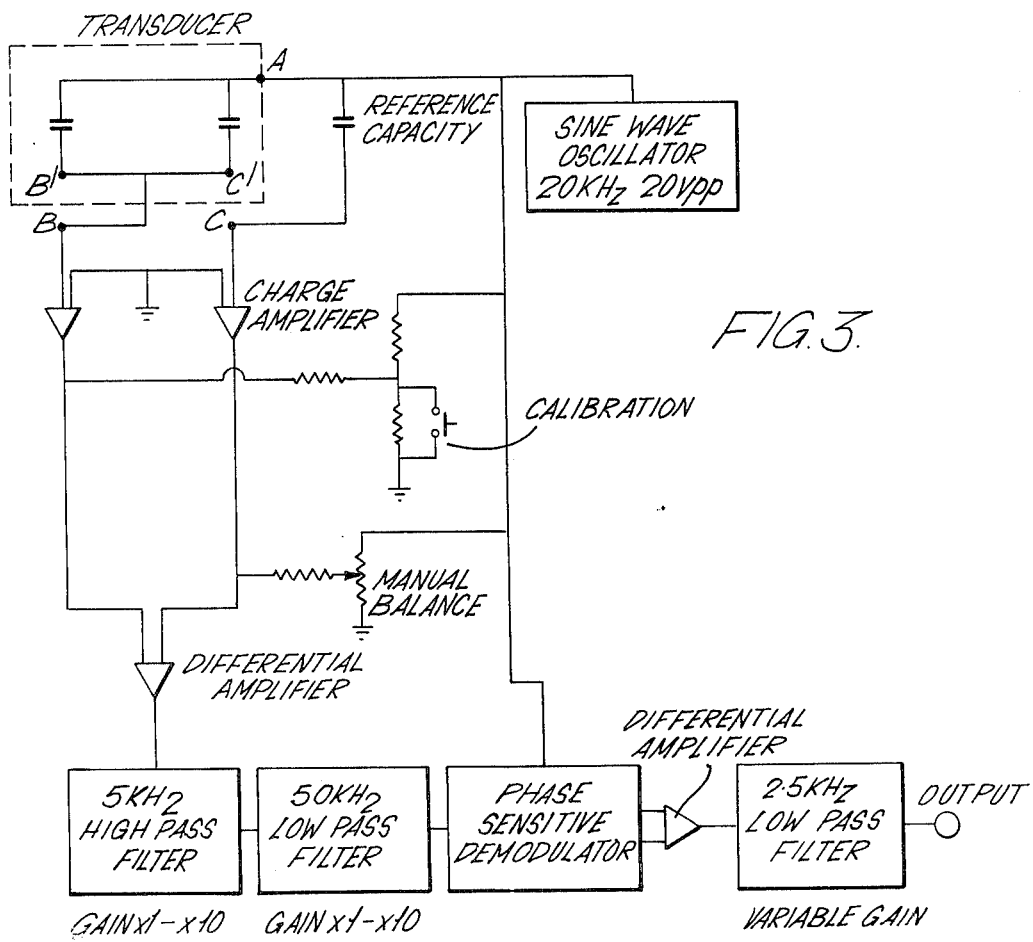
FIG. 3 shows a schematic circuit diagram of the apparatus having the transducer arrangement of FIGS. 1a and 1b.

The circuit diagram of FIG. 3 is similar in many respects to that shown in FIG. 3 of specification No. 1340703. The transducer arrangements of FIGS. 1a and 1b form the dotted portion of the circuit enclosed within the dotted outline, the positions A, B', C' correspond to the terminals A, B', C' of FIGS. 1a and 1b. The transducer arrangement is connected to one arm of a four terminal network, and a reference capacitor of constant capacitance is connected to another arm of the network, the two arms then being connected to two charge amplifiers. The input impedances of the charge amplifiers form the other two arms of the network. The outputs from the charge amplifiers are connected to a differential amplifier and the output signal from the differential amplifier amplified and modulated in the following portion of the circuit which is identical to that of specification No. 1340703.

When more than one variable capacitor is used in the transducer arrangement, for example when measuring the diameter of a rod, the variable capacitors are connected in parallel as shown in FIG. 3 so as to obtain a sum of their capacitances as an output from the transducer. The reference capacitor is usually set to a value typical of a reference linear quantity, eg. a nominal diameter of a rod or the bore of a tube to be measured, or a calibrated bar or tube. In the latter case a standard rod or tube of known diameter can be passed through the transducer arrangement before being replaced by a rod or tube to be measured.

In operation, for example to measure the diameter of an earthed rod, an oscillator can feed the reference capacitor and the transducer arrangement with a 20KHz carrier signal. The plates of the capacitors in the capacitative transducer each have a direct capacitance to the earthed rod, and a leakage capacitance to the acceptor plates of the transducer as explained in specification No. 1340703. The outputs from the transducer arrangement and the reference capacitor are fed to the charge amplifiers and the output from the differential amplifier, which receives the outputs from the charge amplifiers, is a measure of the diameter of the rod or bore of the tube after amplification and demodulation.

One of the major advantages of the invention is that the measurements are non-contacting.

For optimum results it is desirable that the two diametrically placed variable capacitors have identical characteristics. This can be achieved by machining and potting the plates of the variable capacitors and the earth screen as one unit, separating them into halves and machining back the capacitor plates to the required depth below the earth screen.

The invention also has applications in which the capacitative transducer arrangement has only one variable capacitor, for example, for liquid level and temperature measurement.

Referring now to FIG. 4 a probe 59 for liquid level determination is shown in median section and in the form of a thick walled glass tube 60 closed at the lower end. The upper end of the glass tube 60 is joined to a stainless steel tube 61, a vacuum tight seal being made at the join by an 'O' ring 62 in an annular groove 63. The probe 59 can be lowered into the vessel which can contain a highly active and corrosive liquid 64.

Two parallel wires 65 and 66 are arranged within the glass tube 60, the wires being spaced apart and extending the length of the tube 60. The wires can be held in position by a ceramic filler 67 such as magnesia. Screened leads continue within the stainless steel tube 61 and are joined to terminals A and B of the apparatus of FIG. 3 in place of the transducer arrangement shown in FIG. 3. The reference capacitor of FIG. 3 is selected to have a value representing a reference depth.

An electrostatic field generated by the wires 65 and 66 when energised by the oscillator extends outwards from the probe 59 and is substantially uniform along its length, the capacitance of the field varying with changes in the level of the liquid 64 and therefore provides a measure of the depth of the liquid 64. For certain applications the probe 59 can be formed from plastic tubing.

An example of temperature measurement by the invention is shown in FIG. 5 to which reference is now made. In FIG. 5 a probe 68 for a mercury thermometer 69 is shown to an exaggerated scale in median section, and comprises a tubular metal shell 70 having a length sufficient to cover the length of the stem 71 of the thermometer 69 leaving the thermometer bulb exposed. The shell 70 is disposed around the stem 71 and is dimensioned to provide an annular gap 75 between the shell 70 and the stem 71. Two PTFE annular spacers 76 are disposed one at each end in the bore of the shell 70 in which they are a push fit. The bore of the spacers 76 is a sliding fit around the stem 71. Two mutually opposite slots 77 on a common diameter are provided through the bore of each spacer 76, and the spacers are arranged in the shell 70 with the slots 77 in a plane containing the longitudinal axis of the shell 70. Two fine wires 72 and 73 extend one on each side of the stem 70 through the slots 77 so that mercury 74 and the glass stem 70 is between the wires 72 and 73, the wires 72 and 73 being affixed to the spacers 76 with an adhesive.

The wires 72 and 73 are connected to terminals A and B of the apparatus shown in FIG. 3 in a similar manner to that described in relation to the probe 59 of FIG. 4. A reference capacitor in the circuit of FIG. 3 is selected to represent some reference length of mercury 74 and therefore a reference temperature. In operation, the capacitance of the probe 68 varies with change in length of the mercury 74 and results have shown a response with sensitivity better than 0.1° C.

Figure 6:
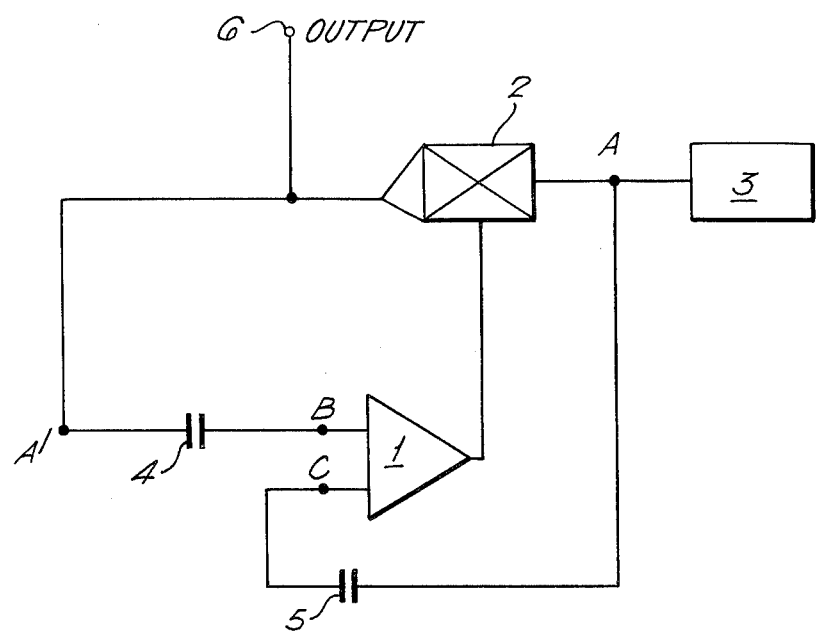
FIG. 6 shows a circuit diagram of the apparatus of FIG. 3 but modified so as to determine film thickness.

An alternative arrangement for providing an output from the apparatus of FIG. 3 is shown in FIG. 6 to which reference is now made. In the circuit diagram of FIG. 6, that part of the apparatus of FIG. 3 between the terminals B, C and the output side of the differential amplifier (i.e. the charge carrier amplifier system) is represented by the triangular space 1 in the circuit, and the output of the system 1 is fed to a multiplier and control circuit 2 which is also connected to an oscillator 3. Typically, the oscillator 3 can provide a carrier voltage which is a sine wave at 20KHz.

The output of the charge carrier amplifier system 1 is fed to a multiplier and control circuit 2 which latter is also connected to an oscillator 3. Typically the oscillator 3 can provide a voltage which is a sine wave at 20KHz.

The carrier voltage V applied at point $A^1$ in FIG. 6 is automatically varied in amplitude according to changes in the capacitance of a capacitance transducer 4 having a variable capacitance by means of the feedback loop from the amplifier 1 to the circuit 2. The arrangement serves to maintain the transducer 4 capacitance charge Q constant while allowing the voltage V to vary with capacitance C.

Points A, B and C in FIG. 6 correspond to Points A, B and C in FIG. 3. A reference capacitor 5 as required in the circuit of FIG. 3 is connected between the point C and the output of the oscillator and represents a reference dimension. In this present arrangement, the connection point A is between the oscillator 1 and the multiplier and control unit 2.

The system output is obtained at 6 and is a sine wave, variations in the voltage applied at $A^1$ representing corresponding changes in the dimension. Background noise is eliminated from the signals obtained at the output 6.

The theoretical basis for the apparatus of FIG. 6 resides in the fact that capacitance C between two plates is inversely proportional to plate separation D. Thus any attempt to measure capacitance directly between two plates as a function of separation, will result in a nonlinear output. A charge carrier amplifier measures the variations in charge Q and from the basic equation for a capacitor, namely $Q = CV$, it is seen that a charge carrier amplifier measures capacitance changes by keeping the voltage constant. Hence Q is proportional to capacitance C.

However if Q is constant, then $C \propto 1/V$ and since $C \propto {}_d{}^1$ then $V \propto L$. Thus by keeping Q constant and allowing the carrier voltage V to vary with C, it is possible to obtain a linear output of displacement D, and such an arrangement is provided by the circuit depicted in FIG. 6.

Figure 7:
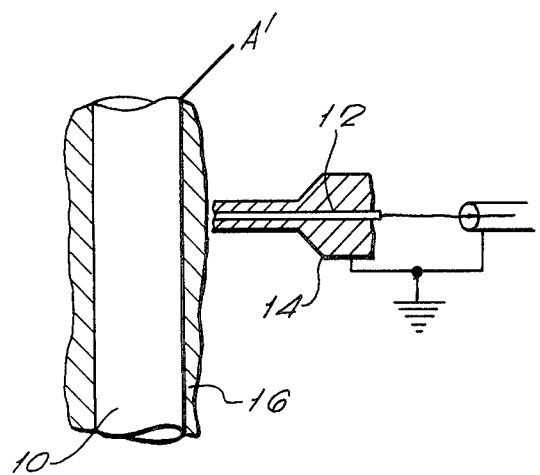
FIG. 7 shows a diagrammatic sectional representation of a thickness measuring probe for use in the apparatus of FIG. 6.

An arrangement for measuring the thickness of an oxide layer deposited on an irradiated fuel pin from a nuclear reactor and using apparatus in accordance with the circuit of FIG. 6 is shown in FIG. 7 to which reference is now made.

In FIG. 7, a pin 10 and a probe 12 constitute the capacitative transducer 4 in FIG. 6. Point $A^1$ in FIG. 7 corresponds to point $A^1$ in FIG. 6 and the probe 12 is connected to a point (not shown) corresponding to point B in FIG. 6 in a similar manner to the probes shown in FIGS. 4 and 5. The probe 12, which can be 0.5 mm diameter for example, is surrounded by an earth screen 14. The screen 14 serves as a guard ring for the tip of the probe 12. In operation, the probe 12 is brought into contact with the surface of an oxide layer 16 and the carrier voltage V is applied to the pin 10 at point $A^1$. A high sensitivity is obtainable, for example 1 volt per 10 μm, without any problems of tip wear of the probe 12 affecting the results. Problems of dielectric breakdown are avoided since the smaller the thickness of the oxide layer 16 the lower the voltage applied to the pin 10. A typical carrier voltage range could be 100 mVpp to 20 Vpp. An added advantage results from the fact that it is possible to use long lengths of probe 12 lead, eg 100 meters, without affecting the performance.

The apparatus of FIG. 6 can be used for the accurate measurement of other film thickness, and it will be appreciated that it is not restricted to use with irradiated fuel pins. The apparatus of FIG. 6 may also be adopted for use with alternative transducers 4, such as the probes of FIGS. 4 and 5, and an alternative application resides in accurate surface profile measurements. Thus the probe 12 can be caused to move in a fixed plane across a surface to detect minute irregularities in the surface. In such an application the tip of the probe 12 will be spaced a short distance from the surface, the intervening air serving as the dielectric.

I claim:

1. Apparatus for determining a linear quantity, which apparatus comprises a capacitative transducer having members adapted to form at least one capacitance variable in accordance with changes in said quantity; a capacitor of substantially constant capacitance with respect to said changes; two charge amplifiers; means connecting the capacitative transducer to one of the charge amplifiers and the constant capacitor to the other charge amplifier in two separate arms of a four terminal network having four arms, the charge amplifiers having connections such that the input impedances of the charge amplifiers form the other two arms of the network; means for applying an alternating current carrier input signal to the transducer and the constant capacitor, and receiving means for receiving the output from both charge amplifiers and providing an output signal related to the value of said quantity.

2. Apparatus as claimed in claim 1, wherein the capacitative transducer comprises members forming two capacitances variable in accordance with said changes and connected together in parallel relationship.

3. Apparatus as claimed in claim 1, further comprising feedback means adapted to receive the output signal and vary the voltage applied to said variable capacitance in relation to said output signal to maintain a constant charge on said variable capacitance, whereby changes in the applied voltage correspond to changes in the linear quantity.

4. Apparatus as claimed in claim 3, wherein the capacitative transducer is provided in part by a probe means, and a conductive body to be measured provides the other part of said transducer in operation of the apparatus, the capacitative transducer so formed being adapted to determine the distance between the probe means and the body.

5. Apparatus as claimed in claim 4, wherein the distance is defined by a non-conducting film on the body, which film the probe means is adapted to contact in operation of the apparatus.

6. Apparatus as claimed in claim 1, wherein the receiving means includes differential amplifying means, the constant capacitance is selected so that the output from the charge amplifier to which it is connected represents a reference linear quantity, the output of the charge amplifier to which the variable capacitance transducer is connected is adapted to provide positive or negative outputs when the linear quantity to be determined is larger or smaller respectively than the reference linear quantity, and the receiving means is adapted to provide the output signal related to the difference between the outputs from the charge amplifiers.

7. Apparatus as claimed in claim 1, wherein capacitative transducer comprises a probe means adapted for immersion in a liquid and arranged so that the capacitance of the transducer relates to the depth of immersion of the probe means.

8. Apparatus as claimed in claim 7 wherein the probe means comprises a non-conducting tubular casing closed at one end, two wires disposed in the casing in spaced apart relationship and extending along the length of the casing and terminating at one end therein, and an electrically insulating filler material packing the space between the casing and the wires, one of the wires being adapted for connection at its other end to the means for applying an alternating current carrier input signal and the other said wire being adapted for connection at its other end to one of the charge amplifiers.

9. Apparatus as claimed in claim 1, wherein the capacitative transducer comprises a probe means adapted for determining the linear dimension of a column of mercury representing a physical parameter.

10. Apparatus as claimed in claim 9, wherein the probe means comprises a tubular metal shell, two electrically insulating annular spacers located one at each end of the bore of the shell, the spacers having axially directed slots extending from the bore of the spacers in the same plane as the plane containing the longitudinal axis of the shell, and two wires disposed inside the shell and located in each of the slots so as to extend parallel to and one on each side of the longitudinal axis of the shell so as to terminate at a common end of the shell, one of the wires being adapted for connection to said means for applying an alternating current carrier input signal and the other wire being adapted for connection to one of the charge amplifiers.

11. Linear measuring apparatus comprising a capacitative transducer having members adapted to form at least one capacitor variable in accordance with changes in linear dimension of a quantity to be measured; a reference capacitor of substantially constant capacitance with respect to said changes; a four arm bridge; means for connecting the transducer and the reference capacitor as two arms of said four arm bridge; two charge amplifiers; means for connecting said charge amplifiers so that said amplifiers and the inputs thereto form the other two arms of said four arm bridge; means for applying an alternating current input signal to the capacitative transducer and to the reference capacitor; means for deriving a differential output signal from the outputs of said charge amplifiers, and feedback means adapted to receive the differential output signal and vary the voltage of the input signal applied to the capacitative transducer to maintain said capacitative transducer at a constant charge, whereby changes in said applied voltage correspond to changes in said linear dimension.

* * * * *